United States Patent [19]
Gaston

[11] Patent Number: 5,956,048
[45] Date of Patent: Sep. 21, 1999

[54] ELECTRONIC BOOK SYSTEM

[75] Inventor: Kerry R. Gaston, 2474 W. Aberdeen Dr., Montgomery, Ala. 36116

[73] Assignee: Kerry R. Gaston, Montgomery, Ala.

[21] Appl. No.: 08/966,511

[22] Filed: Nov. 10, 1997

[51] Int. Cl.[6] .................................................. G09G 5/00
[52] U.S. Cl. ........................ 345/507; 345/901; 361/681
[58] Field of Search ................................. 345/901, 514, 345/507; 381/331–334; 361/684, 681

[56] References Cited

U.S. PATENT DOCUMENTS

| | | |
|---|---|---|
| 4,159,417 | 6/1979 | Rubincam . |
| 4,445,196 | 4/1984 | Gonet . |
| 4,855,725 | 8/1989 | Fernandez . |
| 4,985,697 | 1/1991 | Boulton . |
| 5,151,997 | 9/1992 | Bailey et al. ........................ 395/800 |
| 5,193,051 | 3/1993 | Ma . |
| 5,239,665 | 8/1993 | Tsuchiya ............................... 395/800 |
| 5,325,262 | 6/1994 | Ma ........................................ 361/681 |
| 5,339,091 | 8/1994 | Yamazaki et al. . |
| 5,438,344 | 8/1995 | Oliva . |
| 5,467,102 | 11/1995 | Kuno et al. . |
| 5,475,398 | 12/1995 | Yamazaki et al. . |
| 5,475,399 | 12/1995 | Borsuk . |
| 5,477,510 | 12/1995 | Ukita . |
| 5,534,888 | 7/1996 | Lebby et al. . |
| 5,661,635 | 8/1997 | Huffman et al. ........................ 361/684 |

OTHER PUBLICATIONS

Coates, Chicago Tribune, Big names roll out tiny computers, Nov. 19, 1996, p. 2, sect. 3.

*Primary Examiner*—Amare Mengistu
*Attorney, Agent, or Firm*—Leydig, Voit & Mayer, Ltd.

[57] ABSTRACT

An electronic book system including a portable display unit and a mated downloading stand which receives the unit in a plug-in manner so that data and power ports of the unit matably connected with respective data and power connectors of the stand. Upon insertion, data is downloaded to a memory in the unit when a data signal is supplied through the data port. The display device has a tabular shaped housing with a display screen and control buttons applied to a front planar surface of the housing. The stand is modularly designed to be stacked adjacently with additional like stands in mated connection with each other for common data and power communication. A system for preventing unauthorized use of stored book data is also provided wherein each unit is assigned a unique electronic code value, and wherein the book data on a particular storage medium may be initially accessed by any coded unit, but wherein subsequent access by other units is denied.

6 Claims, 6 Drawing Sheets

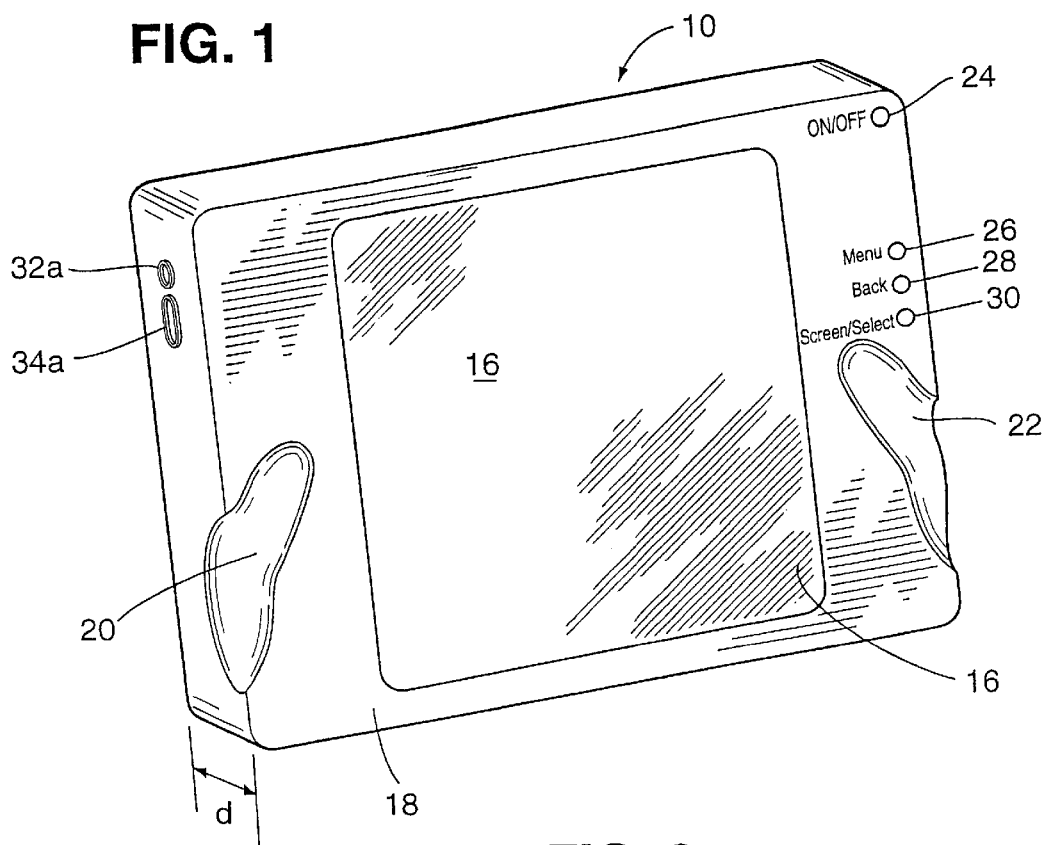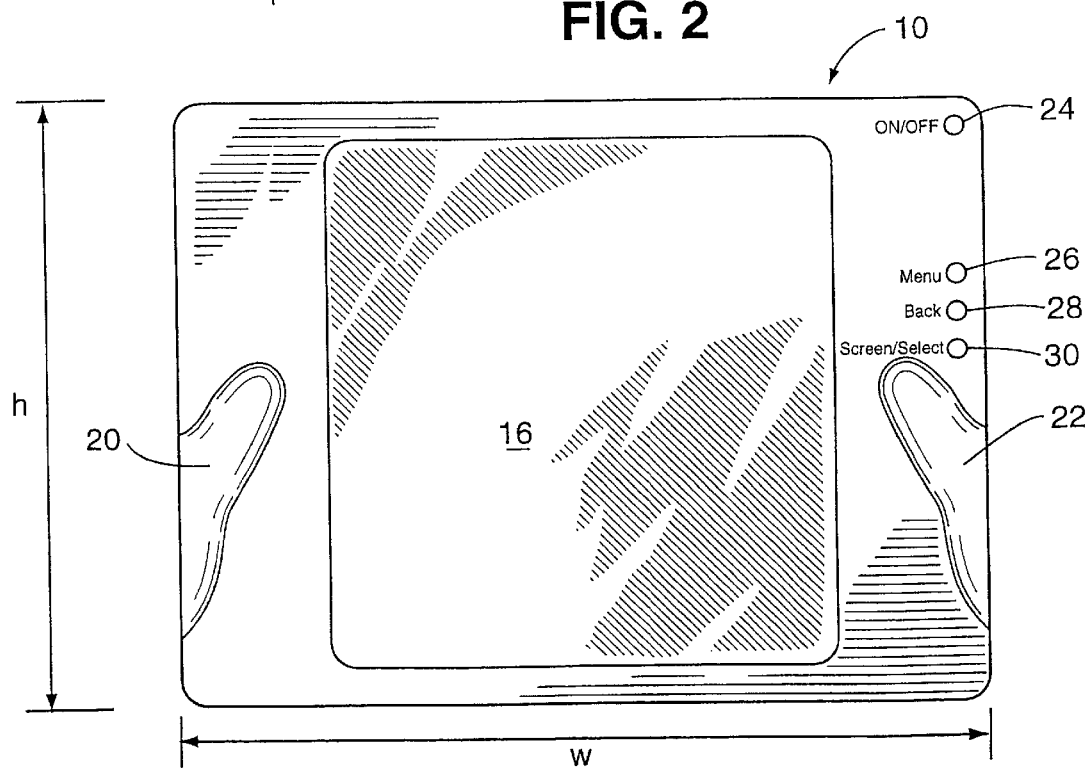

ELECTRONIC BOOK SYSTEM

BACKGROUND

The present invention relates to hand-held display devices and more particularly relates to a system having a portable electronic book display unit and an associated power and data transfer stand.

Electronic books are disclosed, for example, in U.S. Pat. Nos. 4,445,196, 4,855,725, 4,985,697, and 5,475,398. An improved electronic book system is needed, however, which meets the needs of everyday book readers. In particular, an electronic book system is needed which provides a convenient and inexpensive book display unit which is durable and resistant to a typical environment for reading, such as at the beach or pool. Additionally, a need exists for a system which facilitates the protection of text data offered for use in electronic display units. Moreover, a need exists for a system that permits the convenient battery recharging and data downloading into an electronic display unit.

SUMMARY OF THE INVENTION

The present invention meets the aforementioned needs by providing an improved electronic book system. In particular, the invention provides a hand-held portable display unit that receives and stores an amount of data and electronically displays such data in a page-like format generally resembling a page of a conventional book. The display unit has a size and shape comparable to the convenient size of a paperback book and permits a user to select a desired portion of text to be displayed, such as by advancing "pages" forward or backward.

The display unit preferably has a durable housing which holds a generally page-shaped display screen. The housing is formed to have ergonomically-shaped side portions with thumb-shaped frontal depressions for comfortable gripping. Control buttons are mounted along at least one of the side portions for easy manipulation by a users thumb. The housing is preferably formed from a soft material to enhance comfort, durability, and resistance to water, sand, drinks, etc. The soft characteristic of the housing protects the unit from shocks and impacts. Alternatively, the housing could be formed of multiple layers, having at least one layer formed of such a soft material.

The display device is battery-powered and includes a memory which receives text downloaded from a computer or from a separate loading device. For conveniently loading data into the memory and recharging the battery, the electronic book system includes a stand adapted to receive the display unit. This stand has a base with side-mounted power input port connectable to a power supply and data input port connectable to a data source, such as a parallel port of a PC. The stand may be connected to an intermediate switching device to eliminate a need to allocate a parallel port dedicated to this function. The PC delivers the book data to the stand from any appropriate storage medium, such as a diskette, compact disc, a hard drive, or even from a source accessible over a modem or the Internet. The stand and book device have a pair of correspondingly matable plug connectors for respectively providing power supply and data line communication to the display unit when the display unit is inserted into the stand.

The stand has a modular design with corresponding male and female data and power input ports mounted at opposite sides and which are through-connected. This facilitates a side-by-side stacking of the multiple stands so that the mated power and data ports of adjacent stands are connected together, permitting battery recharging and data downloading of multiple display units simultaneously.

In an alternative embodiment which eliminates a need for downloading, the system can include modular memory cartridges for storing discrete amounts of book data. For example, book data can be stored on a ROM chip or other appropriate storage medium housed in a cartridge that is adapted to be plugged into a mated receptacle on the display unit. Such a system would permit publishers to offer a particular book or novel stored on a plug-in cartridge for reading on the electronic display unit. Solid state technology is preferred in order to maximize reliability and minimize cost of the system, but the display unit could also be provided with a disc reader to display data provided on magnetic or laser disc storage media.

For protecting book data from unauthorized copying, the electronic book system of the invention also provides a coding system that permits a one-time accessing of the data or which permits access from a particular display unit which first receives the data. More specifically, each display device may have a code programmed therein that distinguishes it from all other display devices. If a user purchases a novel in disc form for downloading from a PC, or in the form of a plug-in memory cartridge, the system automatically stores the particular unit's code on the disc or memory chip. After the first use, if a comparator in the display unit detects that the disc or cartridge already contains a different code, the processor restricts the use of the data or restricts loading of the data into memory.

BRIEF DESCRIPTION OF THE DRAWINGS

FIG. 1 is a perspective view of an electronic display unit constructed in accordance with teachings of the present invention;

FIG. 2 is a front elevational view of the display unit shown in FIG. 1;

DETAILED DESCRIPTION OF THE PREFERRED EMBODIMENTS

Figure 3:
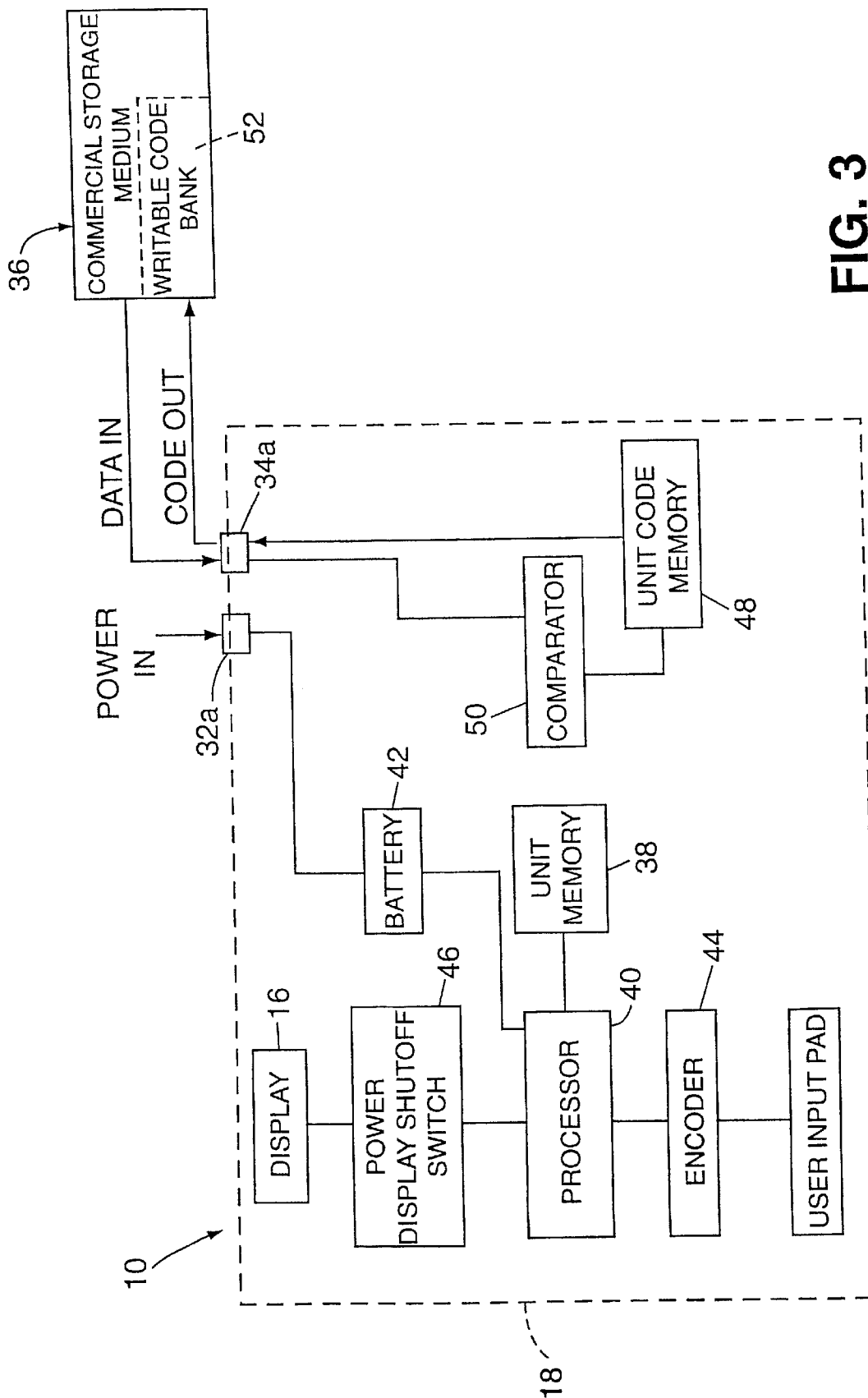
FIG. 3 is a schematic view of a display unit according to an embodiment of the invention configured for receiving and storing downloaded data.

Now referring to the Figures, wherein like numerals designate like parts, FIGS. 1 and 2 illustrate a hand-held portable display unit 10 constructed in accordance with the teachings of the present invention. The display unit 10 includes a housing 18 which holds a display screen 16 to display text. The screen 16 can be any suitable display, such as an LCD display or plasma display. Preferably, the screen 16 is about 6½ inches by 6½ inches.

So that the unit 10 is convenient for reading, the housing 18 is generally book-sized, as viewed toward the screen 16, preferably having a width (w) of about ten inches, a height (h) of about 7½ inches, and a thickness (d) of about one inch. At opposite sides of the screen 16, the housing 18 is ergonomically formed with thumb-shaped indentations 20, 22 to comfortably receive a user's thumbs (not shown) when the device is held, permitting comfortable elevation of the device 10 such as during nighttime reading. Further indentations (not shown) for the fingers or palms may be incorporated in the design. The depressions 20, 22 assist the user to hold up the display device 10, especially during prolonged reading, by lessening gripping fatigue in a user's hand.

The housing 18 is preferably formed of a material that provides a slight cushioned feel. For example, the housing 18 may be constructed of various polymers or thermoplastics that slightly yield or flex under pressure, or the housing 18 may otherwise include multiple layers wherein an outer layer is a rubber-like or foam material. The cushioning effect adds comfort for a reader and also protects the display unit 10 from being damaged by an accidental impact.

As illustrated in FIGS. 1 and 2, a user input pad comprising a plurality of control buttons are mounted in a spaced manner along a side of the housing 18 above one of the thumb indentations. These buttons operate various display functions, and preferably include an on/off button 24, menu button 26, back button 28, and a screen/select button 30. These buttons operate the unit 10 as described below:

1) "On/off" button 24. This button 24 turns the unit 10 on and causes a selected displayed screen to be electronically marked or remembered when the unit 10 is turned off. Like a bookmark, the last-displayed screen reappears when the unit 10 is turned on again. When a book is turned on for the first time, then the first screen of the book is displayed.

2) "Screen/Select" button 30. This button 30 is placed just above and to the side of the thumb indentation 22. Its precise location depends on the design and the comfort of the user, and could actually be inside the thumb indentation 22. When the screen/select button 30 is depressed, the display 16 advances to the next screen of the book. The screen/select button 30 is also used for selecting a displayed menu option, as explained below in connection with the menu button 26.

3) "Back" button 28. Pressing this button 28 causes the display to move one screen or "page" at a time back through the book.

4) "Menu" button 26. Pressing this button causes a menu to be displayed on the screen which lists a variety of control options. Repeatedly pressing the "Menu" button causes a cursor or highlighter to skip from one option in the list to the next, and a desired option may then be selected by the "Screen/Select" button. An exemplary list of menu options is as follows:

a) "Text size" option. When selected, the screen displays a choice of text sizes from small to large. By again selecting this in a repeated manner, the user can sample the range of text sizes. The preferable text size can then be selected by pressing a "screen/select" switch.

b) "Brightness" option. Selection of this option allows for darkening or lightening the screen.

c) "Bookmark" option. If the user wants to place a bookmark on a particular screen, selecting this option will mark the currently displayed screen.

d) "Find" option. Selection of this option allows the user to go to a specific location in the book. For example, by selecting this option and using the "screen/select" button, the user control the display to go to a screen at the beginning of the book, the end of the book, specific chapters or parts of the book (such as the "forward" or "index"), previously marked screens, or to a specific screen or "page". An added feature is that the user can conveniently go to the text for any reference in the index.

e) "Status" option. Selection of this option causes displays various information about the book data or the system. For example, the display may indicate the total number of pages in the book, battery level, etc.

f) "Which Book" option. In an embodiment wherein multiple volumes are accessibly stored, this option permits selection of an available book.

g) "Exit" option. Selection of "Exit" exits the menu selection screen.

Various other menus and options can be provided to facilitate desired control operations. If multiple menus are available, pressing the "Back" button causes the display to return to a previous menu selection.

Other embodiments may include optional features such as a left-handed models, models that have thumb and finger indentations which are custom-fit to a particular user's hands, models having a variety of sizes and colors, models capable of responding to audible input (e.g. "turn page") or providing audible output, such as automatically "reading" a book aloud, a receiver, such as for taking orders, e.g., "turn page", and as a sender such as for reading the book out loud. The display may animate a "page turning" effect each time the "screen/select" or "back" button is pressed. Information such as page number, title, of chapter headings, etc., can also be displayed placed on each screen of text or illustration data. Also, the unit may be equipped with an optional solar cell for recharging the battery in sunlight.

To permit connection of the unit 10 to power and data supply lines, a power port 32 and a data port 34 are located at a left side of the housing 18, as shown in FIG. 1. Each of the ports 32, 34 is an appropriate type of plug connector, such as a type having pin receptacles (not shown). These ports 32 and 34 are preferably positioned at the same side of the unit 10 for convenient connection during which battery power is recharged and data is loaded as described below in connection with FIGS. 6 and 7.

Now turning to FIG. 3, the display unit 10 is shown with a data source 36, which, as illustrated, is a commercial storage medium. Basically, the display unit 10 illustrated in FIG. 3 is configured to receive and store book data which may be downloaded from a personal computer (PC) or other loading device (discussed in greater detail below in connection with FIGS. 7 and 8) which can access information from the data source 36 from an appropriate drive or reading device, such as from a disk drive. Accordingly, the data source 36 may be a locally-stored medium such as a CD-ROM, a magnetic diskette, a tape, etc., which is read and delivered via the PC or other loading device (as described in connection with FIGS. 7 and 8), or the data source may be accessed through a network, such as the Internet. A publisher may offer many book selections available on the same type of commercial storage medium, each of which may store data for one or more books.

Among other components, the unit 10 has an internal memory 38, a processor 40 and a battery 42 mounted within the housing 18. The data is delivered to the unit 10 through the data port 34 to the internal memory 38 which accessibly stores the data until purged, erased, or overwritten by loading different data at a later time. The memory 38 may be, for example, a conventional RAM chip. While the memory 38 may have a very large capacity, it may be desirable to provide the memory 38 with a limited capacity, (e.g., enough to store one typical long novel) in order to minimize the cost and size of the unit. Of course, it may be desirable to provide the memory with a capacity large enough to store several books at one time, so that the user has a choice of which volume to read. The memory 38 is preferably of a type that is overwritten each time a new book is downloaded. Also, the memory 38 may be of a type which requires a small voltage to retain the stored data.

The processor 40 receives the data from the memory 38 and also receives user input signals (corresponding to the above-described button operations) from the user input pad or control buttons 24, 26, 28, 30 via an appropriate encoder 44 which provide a predetermined signal for each of the buttons. The processor 40 determines an appropriate display for the conditions and delivers a display signal to the display 16.

The display screen 16 may be an LCD display, an LED display, a plasma display, a CRT, or some other appropriate type of display. Preferably, the display screen 16 is of a type which is light-emitting or backlit when necessary for readably displaying in the dark.

The battery 42 provides power to the unit 10 for its independent operation. The battery 42 may be any type of a suitable size and weight with a suitable voltage and capacity to sustain operation of the unit 10 for a desirable amount of reading time. The battery 42 is preferably rechargeable and is configured to receive a recharge voltage from the power port 32. In order to prolong the life of the battery 42, the processor 40 is preferably programmed to control the display with a predetermined power management features. For example, the processor 40 may be programmed such that if no user input signal is received after a predetermined period of time, the display 16 will be shut down by a powersaving display shut-off switch 46. In embodiments where the memory 38 requires a voltage for data storage, the battery 42 provides a constant voltage to the memory 38.

In an optional embodiment, the unit may have an appropriate pressure sensitive touch input screen (not shown) which allows a user to make "notes" on the displayed book text or in the margin. In such a unit, the memory 38 is of a type that erasably stores the written input for subsequent display.

Figure 4:
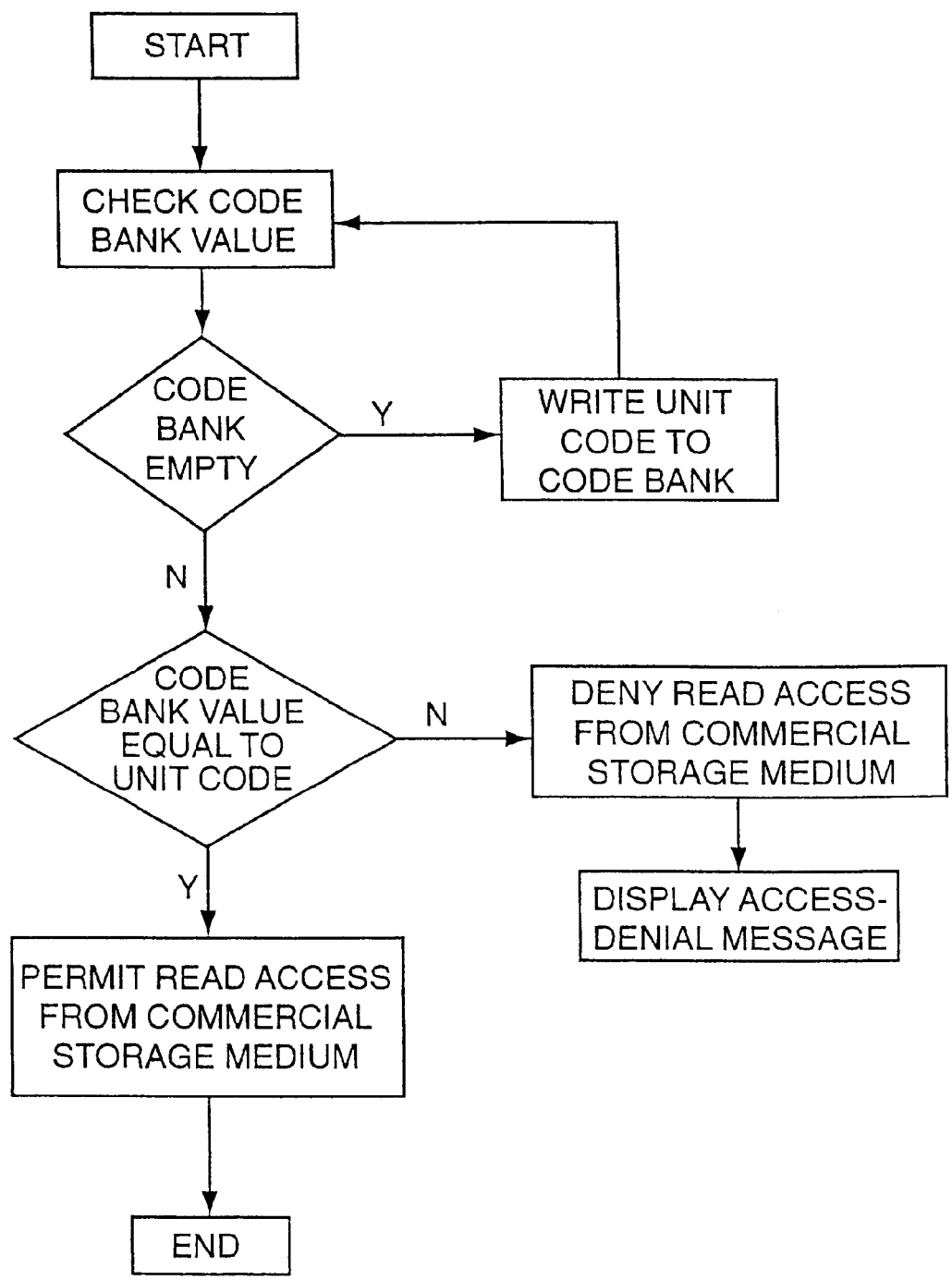
FIG. 4 is a flowchart illustrating an exemplary operation of the coding system according to the invention.

For preventing the unauthorized dissemination of copyrighted material, the electronic book system of the invention includes a coding system for limiting the use of data of the commercial storage medium 36. For example, the coding system may restrict the downloading of data to only one individual display unit 10 or to a limited number of display units 10. This is facilitated by providing each unit 10 with a unit code memory 48 that stores a unique code value, a comparator 50, and by providing each commercial storage medium 36 (such as a diskette) with a writable memory bank 52. FIG. 4 shows an exemplary program to execute the protection function of the coding system in the following manner. The first time that the commercial storage medium 36 is accessed to download data to the unit 10, the comparator 50 receives a signal corresponding with a value stored in the code bank 52, as illustrated in FIG. 3. If the code bank 52 is empty (e.g. storing a code bank value of some predetermined value such as zero) the comparator 50 recognizes that there is a differential between the code bank value and the unique unit code value stored in the unit code memory 48. The unit 10 then sends the unit code value to the writable code bank 52 where the value of the unit code memory is permanently stored. The book text and/or illustration data is then downloaded into the unit memory 38 for authorized display of the data with the unit 10.

The owner of a particular unit 10 may continue to re-download data to the internal memory 38 from a previously-viewed book stored on specific commercial storage medium 36. At this subsequent downloading from the same commercial storage unit 36, the comparator 50 recognizes that the values stored in the code bank 52 and unit code memory 48 are identical, and access to the data is permitted for downloading. The coding system, however, prevents a subsequent downloading of data from the commercial storage medium 36 when attempted by another unit 10 having a different unit code value. The comparator 50 recognizes that a value had previously been written to the code bank 52 and that a difference exists between the values stored in the code bank 52 and the unit code memory 48, and access to the data is denied. The display screen 16 is caused to display an appropriate message.

Figure 5:
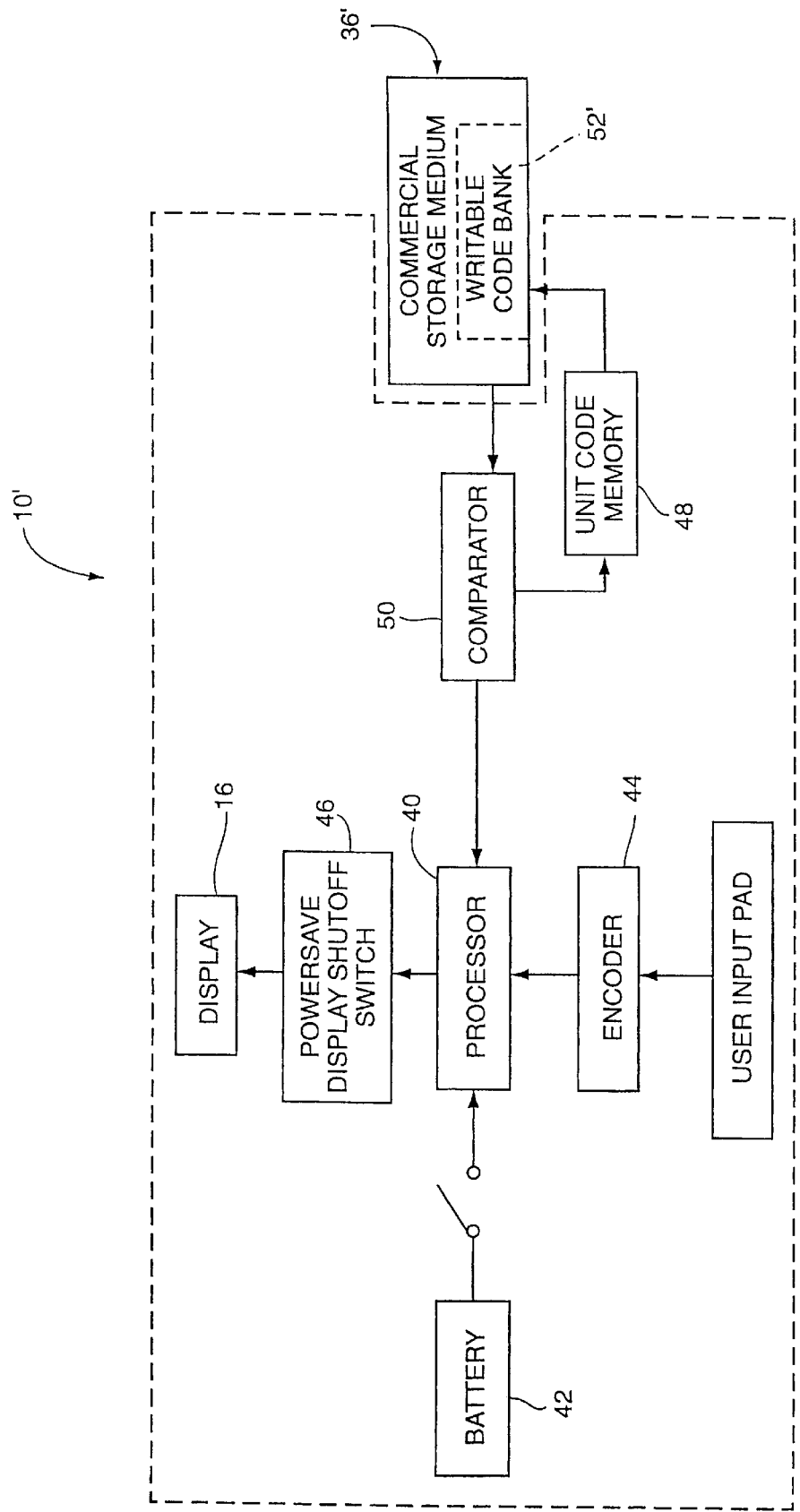
FIG. 5 is a schematic view of a display unit according to the invention configured for receiving a modular data storage cartridge.

As shown in FIG. 5, a display unit 10' is illustrated which operates in substantially the same manner as described above, except that the data source or commercial storage medium is in the form of a modular memory cartridge 36' containing an appropriate memory chip that contains a read-only memory portion containing the book data and preferably also containing a writable memory portion forming a code bank 52'. Alternatively, the cartridge 36' may be a disk, tape, or some other medium with an appropriate reader contained in the unit. In the embodiment shown in FIG. 5, the unit 10' is configured to pluggably receive and removably hold the memory cartridge 36', which remains plugged into the unit 10' during the period of portable display use of its data. This embodiment eliminates a need to perform a downloading operation from a loading device, like a PC. A need is also eliminated for a dedicated internal data memory, such as the internal memory 38 of the portable display unit 10 illustrated in FIG. 3, however, the embodiment of FIG. 5 could contain an internal data memory if desired. The memory cartridge 36' also contains a writable code bank 52' to restrict its use in the manner described above in connection with FIGS. 3 and 4.

Figure 6:
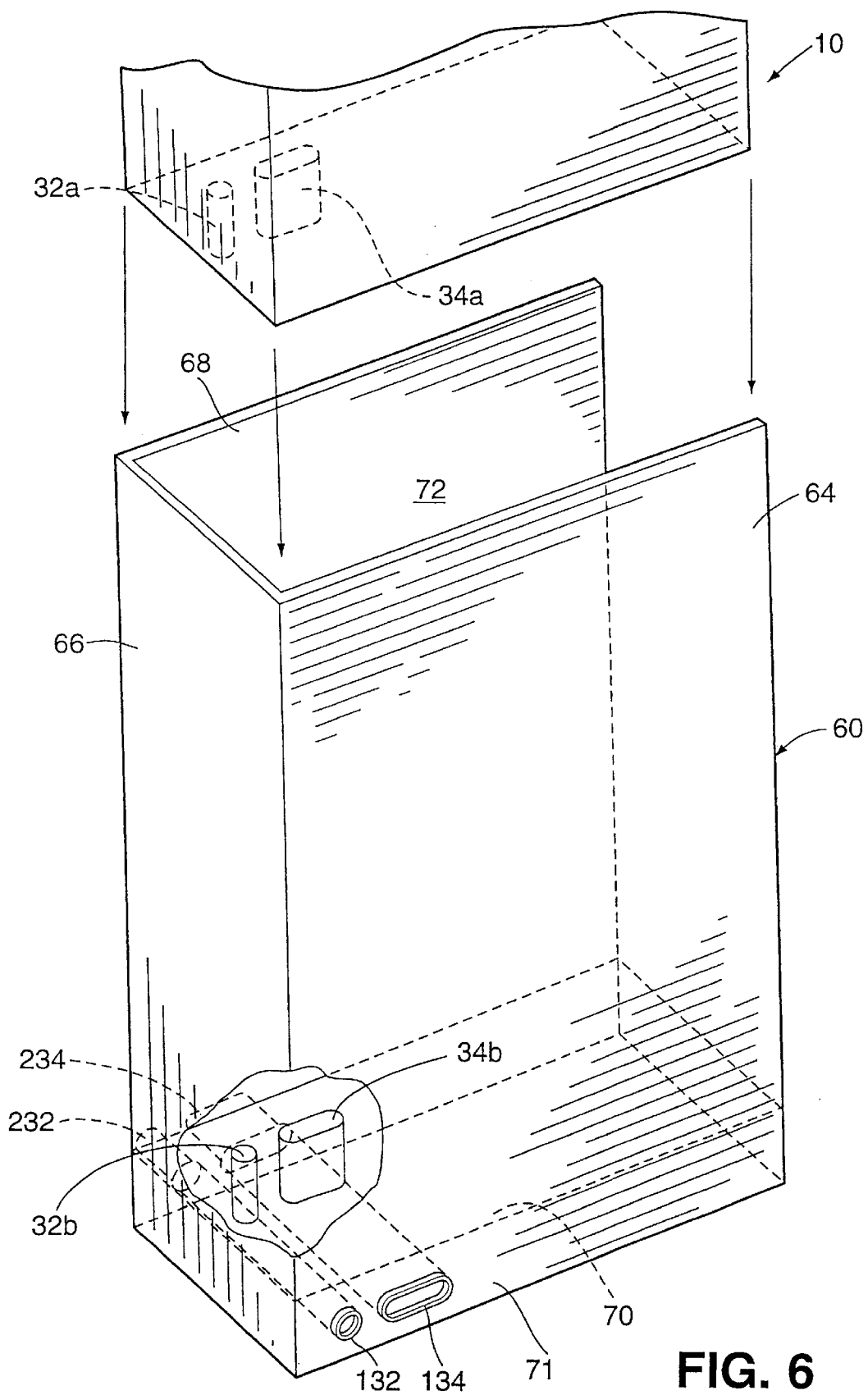
FIG. 6 is a partial exploded perspective view of a display unit and associated stand of the present invention.

The system invention of the invention also provides a structure for conveniently downloading new data into an internal memory of the portable display unit 10 and simultaneously recharging the battery 42. Accordingly, FIG. 6 illustrates a downloading stand 60 which is configured to slidably receive the display unit 10 in mated connection with the ports 32a, 34a of the portable display unit 10. The structure of the downloading stand 60 facilitates a convenient connection to the ports 32a, 34a for delivering electricity and a data signal to the unit 10.

The stand 60, as shown in FIG. 6, has three upstanding walls 64, 66, 68 and a floor 70 above a base 71, defining an internal cavity 72 shaped to closely receive the unit 10. To provide connectability to external sources for data and electrical power, a power input socket 132 and a data input socket 134 are located in the wall 64 and are externally accessible from a side of the stand 60. The power and data input sockets 132, 134 may be of a pin receptacle type (not illustrated in detail). Within the cavity 72, a power connector 32b and data connector 34b are mounted in an upstanding fashion on the floor 70 of the stand 60 to correspondingly mate with the power port 32a and data port 34a of the portable unit 10 when it is inserted into the stand 60. The power connector 32b and data connector 34b are respectively connected with the power socket 132 and data socket 134 to transfer power and data to the unit 10 from the external data and power sources, as discussed in greater detail below in connection with FIG. 7.

Figure 7:
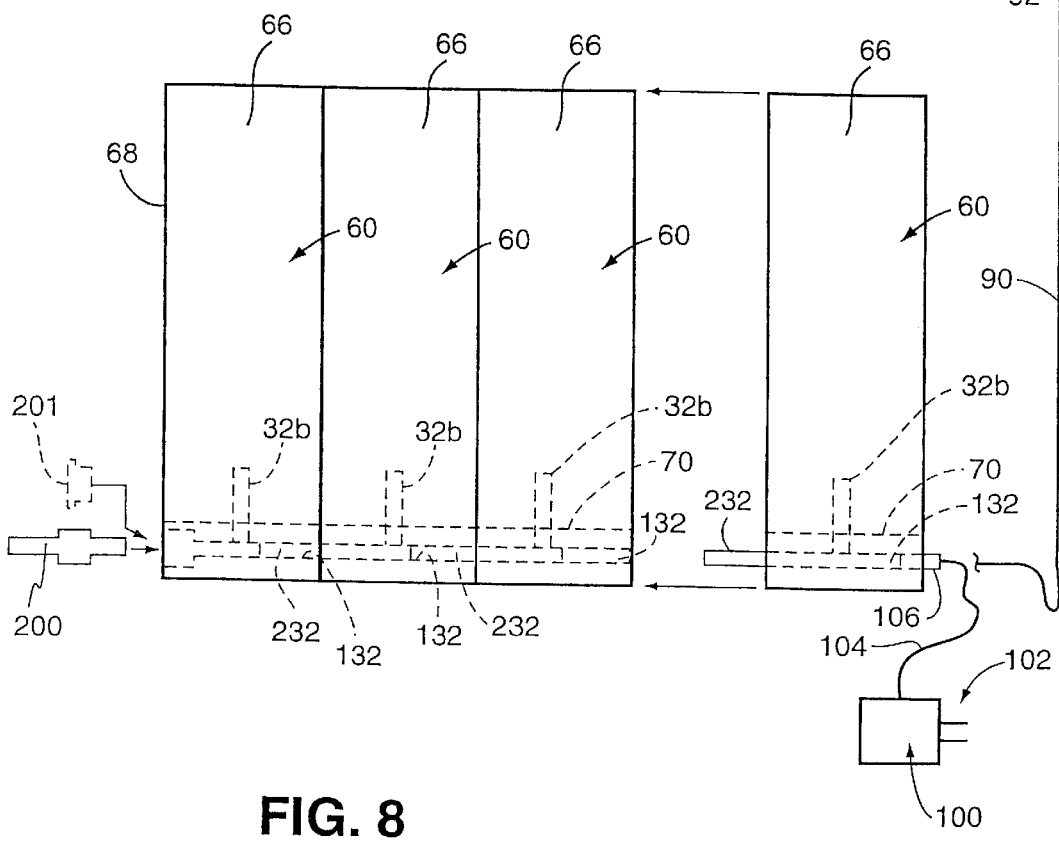
FIG. 7 is a left-side view of a plurality of stands shown in a stacked and interlinked manner.

Another feature according to the invention permits convenient downloading and recharging of multiple portable display units 10 simultaneously. This may be useful, for example, in a classroom or library where multiple portable display units 10 are to be downloaded with the same book data. Accordingly, still referring to FIG. 6, the stand 60 further includes an power output socket 232 and a data output socket 234 mounted in the base 71 opposite of the input sockets 132, 132. These sockets 232, 234 are respectively connected to receive pass-through communication of voltage and data from the input sockets 132, 134. Turning to FIG. 7, the stand 60 is formed in a modular fashion to be stackable in a side-by-side arrangement with other stands 60, so that the output sockets 232, 234 are in mated connection with the respective input sockets 132, 134 of an adjacent stand 60. Thereby, the multiple stands 60 are in like data and power communication with each other and with the external data source and power source.

The data socket 134 is configured to receive a cable from the external data source, such as a PC 95, as illustrated in FIG. 7, or another suitable downloading device for downloading a text and/or illustration file into the display device 10 residing in the stand 60. The power socket 132 is connectable to a voltage source via a power cable with a plug 106 that is insertable into the socket 132, such as an AC/DC transformer 100 having an output appropriately matched to the battery 42 (FIG. 3) of the display unit 10. Thereby, the battery 42 is recharged when the portable display unit 10 is inserted into the stand 60. The transformer 100 may be a conventional type which has a plug 102 that is insertable into a conventional AC wall socket (not shown). Alternatively, the stand 60 may be configured to integrally include a transformer (not shown). Additionally, the stand 60 may be provided with an aesthetically pleasing cover for a permanent freestanding display near the PC, on a library or school shelf, or other location. FIG. 7 shows four stands 60 stacked together, permitting downloading and recharging of four display units 10 via the data input socket 134 and power input socket 132 of an endmost one of the stands 60.

So that unused data and power output sockets 232, 234 do not inconveniently protrude from an individual or endmost stand 60 (such as that at the far left of FIG. 7), these sockets 232, 234 may be combined into a removable plug-in number 200, as shown in FIG. 7, which is removable to provide a flush surface at side 68. The plug-in member 200 can be provided with the unit or sold separately. When the plug-in member 200 is not being used, it may be removed and replaced by a plug 201.

FIG. 7 also illustrates PC 95 used as the downloading device to deliver data to the stand for writing to the internal memory of each of the units 10. The PC is preferably provided with a software that controls the downloading of data from a data source, providing the user a choice as to the data (book text) to be downloaded into the display devices 10 and from which source the book file is to be retrieved, i.e. a disk drive, CD-ROM drive or some other path. A data cable 90 is connected into the input data socket 134 of the stand 60 to deliver the data signal. As illustrated, the data cable 90 is connected to a switching device 92 which is connected to the parallel port of the PC by a cable 93 to transfer the data signal. The switching device 92 permits the parallel port 94 switchably shared among other devices, such as the device 96 when the PC is not downloading data to the stands 60. Alternatively, the socket data cable 90 may be connected directly to a parallel port 94 of the PC. When the user selects a file to be downloaded via the aforementioned software, the computer downloads the selected data to the display unit(s) 10 residing in the stand(s) 60. Also, the software may operate to detect the data already stored in the memory 38 of a particular display device and forewarn a user that a particular title is about to be overwritten. The software may then display a cancel option to abort the downloading.

In an embodiment wherein multiple stands 60 are used to download data selected display units 10, the stands 60 may be provided with a unique address code which is recognized by the PC to permit addressable downloading from the PC to a selected one or more of the stands 60. The software would prompt a user to indicate which stand should receive the data.

Figure 8:
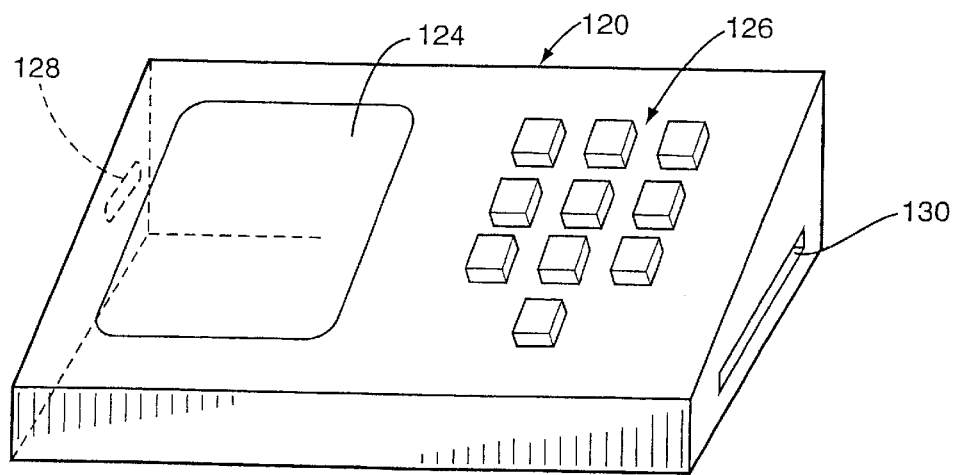
FIG. 8 is a perspective view of a data loading device of the present invention.

The system of the invention may also be provided with a loading device 120, such as the exemplary embodiment illustrated in FIG. 8, which facilitates downloading to a display unit 10 without the use of a PC. This permits the display unit 10 to be used by consumers who cannot afford a PC or for use of the system in applications where a PC is not otherwise needed. The loading device 120 has an appropriate reading device, such as a disk drive, which accepts a disk (or other medium) through a slot 130. The device 120 has a set of control buttons 126 for selecting a loading function and a display screen 124 for displaying operation messages and a menu of downloading choices to the user. A data port 128 is connectable to the data input socket 34 of the stand 60 or directly to the data port 34 of the unit 10 by an appropriate connector or cable. The downloading operation of the loading device 120 is performed in a similar manner to that described above in connection with the PC and may incorporate similar software.

While the invention is described herein in connection with certain preferred embodiments, there is no intent to limit it to those embodiments. On the contrary, it is recognized that various changes and modifications to the described embodiments will be apparent to those skilled in the art, and that such changes and modifications may be made without departing from the spirit and scope of the present invention. Accordingly, the intent is to cover all alternatives, modifications, and equivalents included within the spirit and scope of the invention as defined by the appended claims.

What is claimed is:

1. An electronic book system, comprising:

a storage medium storing book data, said storage medium including
  a book data memory portion, and
  a code bank memory portion, the code bank memory portion storing a code bank value, the code bank value initially being set at a predetermined initial value;

a portable display unit adapted to read and display data from said storage medium, the portable display unit including a unit code memory storing a predetermined unit code value and a comparator comparing the code bank value with the unit code value; and coding means permitting access and display of the data stored on the storage medium by said display unit and preventing access and display of the data when the storage medium was previously read by another display unit;

wherein when the code bank value is at said predetermined initial value, a signal indicating the unit code value is delivered to the code bank and stored thereafter as the code bank value, and wherein the portable display unit can access the data when said code bank value is equal to the unit code value and wherein access to the data is prevented when the code bank value is not equal to the unit code value.

2. The electronic book system according to claim 1, wherein said display unit further comprises a unit memory, and wherein said access is a downloading of data to the unit memory from an external device reading said storage medium.

3. An electronic book system according to claim 1, wherein said storage medium is a diskette.

4. An electronic book system according to claim 1, wherein said storage medium is a cartridge with a memory chip, the cartridge being removably insertable into said housing.

5. An electronic book system according to claim 1, wherein said portable display unit includes a generally tabular-shaped, book-sized housing, and a display screen positioned at a front of said housing.

6. An electronic book system according to claim 1, wherein said unit includes two thumb-shaped indentations in said housing positioned generally at opposite sides of said display screen.

* * * * *